US 6,642,348 B2

(12) United States Patent
Eby et al.

(10) Patent No.: US 6,642,348 B2
(45) Date of Patent: Nov. 4, 2003

(54) MELT PROCESSABLE PMR-TYPE POLYIMIDES

(75) Inventors: Ronald Eby, Akron, OH (US); Michael Meador, Strongsville, OH (US); Christopher Gariepy, Lakewood, OH (US)

(73) Assignee: The University of Akron, Akron, OH (US)

( * ) Notice: Subject to any disclaimer, the term of this patent is extended or adjusted under 35 U.S.C. 154(b) by 102 days.

(21) Appl. No.: 09/798,335

(22) Filed: Mar. 2, 2001

(65) Prior Publication Data

US 2001/0031853 A1 Oct. 18, 2001

Related U.S. Application Data

(60) Provisional application No. 60/186,837, filed on Mar. 3, 2000.

(51) Int. Cl.[7] .......................... C08G 73/10; C08G 69/26
(52) U.S. Cl. ...................... 528/353; 528/125; 528/126; 528/128; 528/170; 528/171; 528/172; 528/173; 528/174; 528/176; 528/179; 528/183; 528/185; 528/188; 528/220; 528/229; 528/350; 528/351
(58) Field of Search ................................ 528/353, 170, 528/125, 126, 128, 171, 172–174, 176, 179, 183, 185, 188, 220, 229, 350, 351

(56) References Cited

U.S. PATENT DOCUMENTS

| | | | | |
|---|---|---|---|---|
| 3,708,459 A | * | 1/1973 | Lubowitz | 264/331.19 |
| 3,745,149 A | | 7/1973 | Serafini et al. | 260/65 |
| 5,041,526 A | * | 8/1991 | Riel et al. | 528/125 |
| 5,041,527 A | * | 8/1991 | Riel et al. | 528/125 |
| 5,041,528 A | * | 8/1991 | Riel et al. | 528/125 |
| 5,132,395 A | | 7/1992 | Serafini et al. | 528/353 |
| 5,171,822 A | * | 12/1992 | Pater | 528/125 |
| 5,322,924 A | | 6/1994 | Chuang et al. | 528/353 |
| 5,939,521 A | | 8/1999 | Chuang | 528/353 |
| 5,965,687 A | | 10/1999 | Jensen | 528/86 |
| 6,262,223 B1 | * | 7/2001 | Meador et al. | 524/600 |

OTHER PUBLICATIONS

The month in the date of publication is not available, Liou, Guey–Sheng et al. *Journal of Polymer Science* 36, 2021–27, (1998).

* cited by examiner

*Primary Examiner*—P. Hampton-Hightower
(74) *Attorney, Agent, or Firm*—Roetzel & Andress

(57) ABSTRACT

The present invention provides PMR-type polyimides that exhibit lower melt viscosities than PMR-type polyimides of the prior art. These PMR-type polyimides are created by incorporating flexible linkages, such as kinked structures and twisted or non-coplanar moietes into the backbone structure of the PMR. Specifically, the present invention provides for the production of PMR-type polyimides having 2,2'-disubstituted biaryls in the polymer backbone.

8 Claims, 5 Drawing Sheets

MELT PROCESSABLE PMR-TYPE POLYIMIDES

Figure 1:
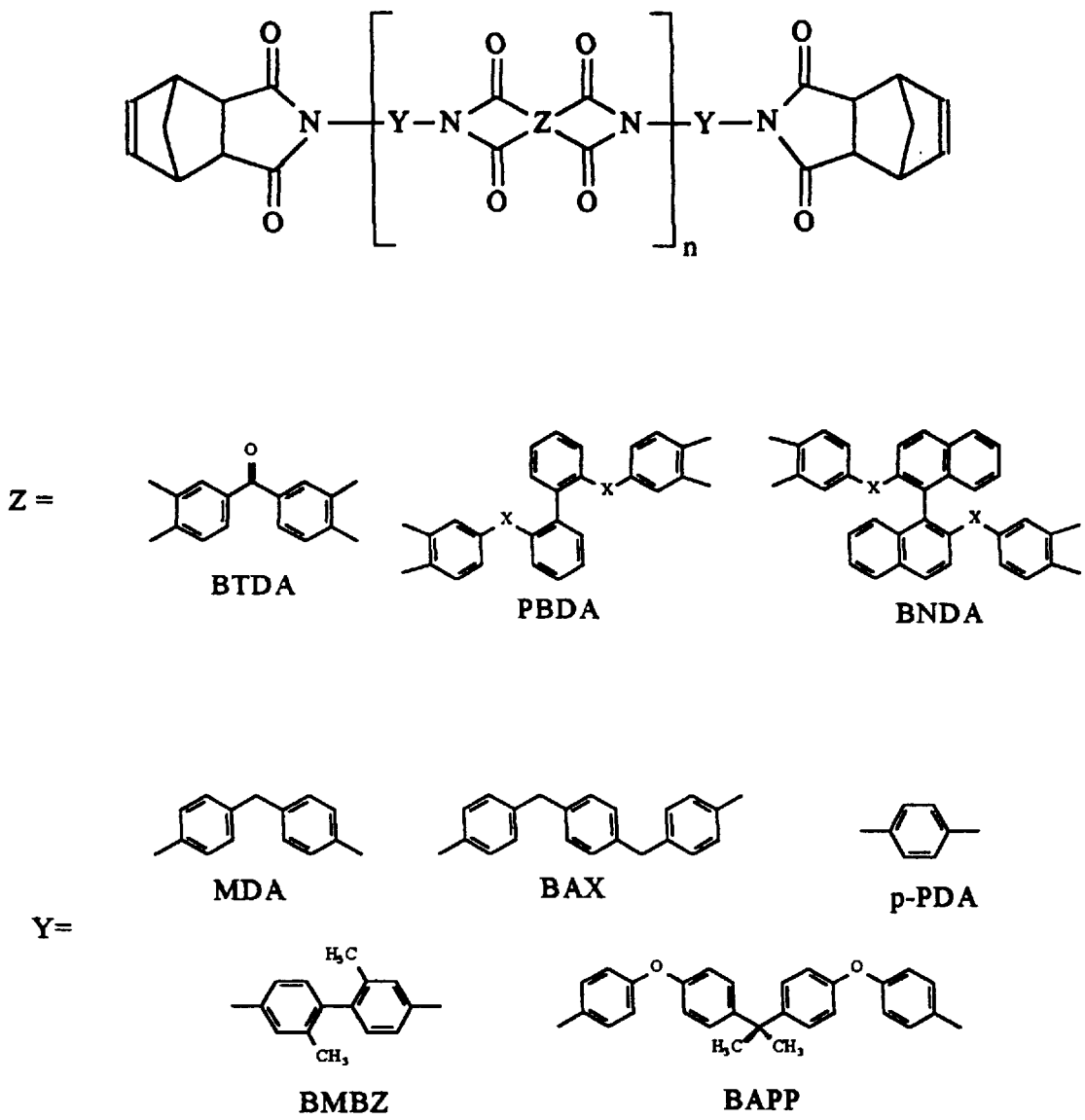

The application claims the benefit of U.S. Provisional Application No. 60/186,837, filed Mar. 3, 2000.

BACKGROUND OF THE INVENTION

The present invention relates generally to high temperature resin systems and more particularly relates to PMR-type polyimide resin systems exhibiting lower melt viscosity than conventional PMR-type polyimides.

High performance polymer matrix composites (PMC) typically possess high thermal-oxidative stabilities (TOS) and high glass transition temperatures ($T_g$) to withstand use temperatures up to 316° C. (600° F.). The use of PMC's could lead to substantial weight savings over metals, which is an attractive feature for aircraft engines, cryogenic fuel tanks, and many other aerospace applications. This weight reduction translates into better fuel economy, increased speed, and increased passenger load.

In 1972, an improved process, known as in-situ Polymerization of Monomer Reactants (PMR) for polyimide composite fabrication was developed by NASA. The PMR process essentially comprises dissolving a monoalkyl ester of 5-norbornene-2,3-dicarboxylic acid, also known as nadic ester (NE), an aromatic diamine, and a dialkyl ester of an aromatic tetracarboxylic acid in a low-boiling alkyl alcohol such as methanol or ethanol. The monomeric solution can be used to impregnate other components such as reinforcing fibers, with in-situ polymerization through the nadic ester end group occurring directly on the fiber surfaces, producing a composite material with excellent thermal and mechanical properties.

Unfortunately, typical PMR-type polyimides are linear addition-cured polyimides that exhibit high melt flow viscosities well above 100,000 centipoise (cP). The melt flow viscosity limits their processing to techniques involving hand lay-up followed by autoclave or compression molding. These other processing techniques are extremely labor intensive and result in high manufacturing costs for components made with PMR-type polyimides.

Resin Transfer Molding (RTM) provides an economical alternative to hand lay-up based processing, but requires a melt viscosity less than about 4000 cP. This is much lower than the minimum melt viscosity of, for example, PMR-15, which is about 250,000 cP. Thus, there exists a need in the art to provide PMR-type polyimides exhibiting increased processability due, at least in part, to a lowered melt viscosity.

SUMMARY OF THE INVENTION

It has been found that PMR-type polyimides can be provided exhibiting lower melt viscosities than PMR-type polyimides of the prior art. These PMR-type polyimides are created by incorporating flexible linkages, such as kinked structures and twisted or non-coplanar moieties into the backbone structure of the PMR. Specifically, the focus of the present invention concerns the production of PMR-type polyimides having 2,2'-disubstituted biaryls in the polymer backbone.

The 2,2'-disubstituted biaryls in the polymer backbone are provided by utilizing 2,2'-disubstituted biaryl diamine monomers and/or 2,2'-disubstituted biaryl dianhydride monomers to form the PMR-type polyimides in a conventional manner. In one embodiment of the present invention, only the diamine used to form the PMR-type polyimide is a 2,2'-disubstituted biaryl monomer, while the dianhydride may be an aromatic dianhydride as typically employed in creating PMR-type polyimides. In another embodiment of the present invention, only the dianhydride used to form the PMR-type polyimide is a 2,2'-disubstituted biaryl monomer, while the diamine may be any aromatic diamine as typically used to produce PMR-type polyimides. In yet another embodiment of the present invention, both the diamines and the dianhydrides employed to produce PMR-type polyimides according to the present invention are 2,2'-disubstituted biaryl monomers. The PMR-type polyimides of the present invention are produced through conventional methods, such as solution polymerization and melt polymerization.

In one embodiment of the present invention is provided an addition-cured polyimide comprising the reaction product of an aromatic diamine; a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride; and a 2,2'-biaryl dianhydride selected from the group consisting of:

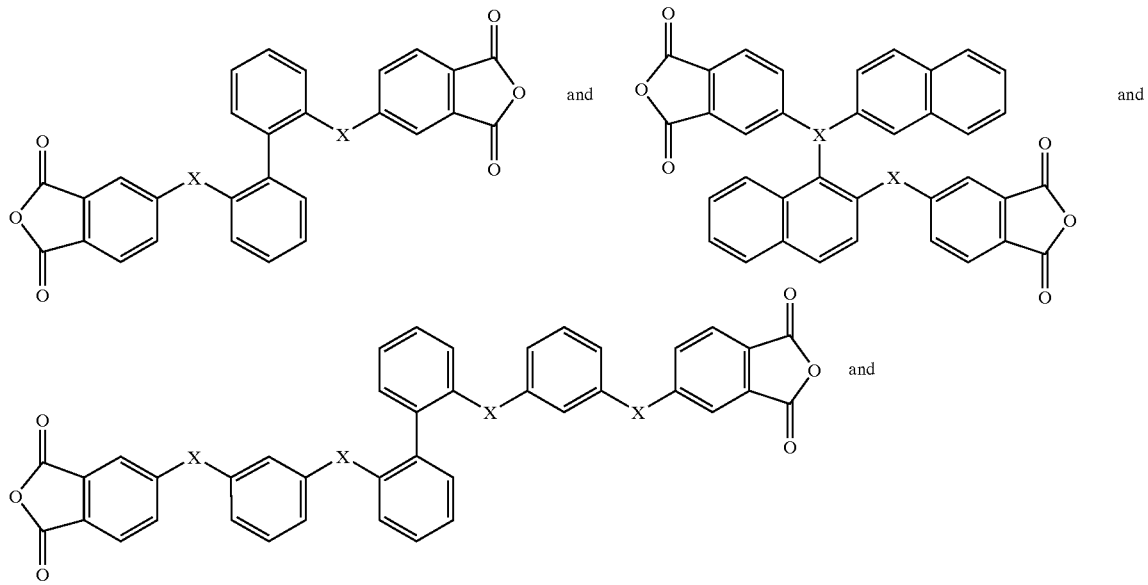

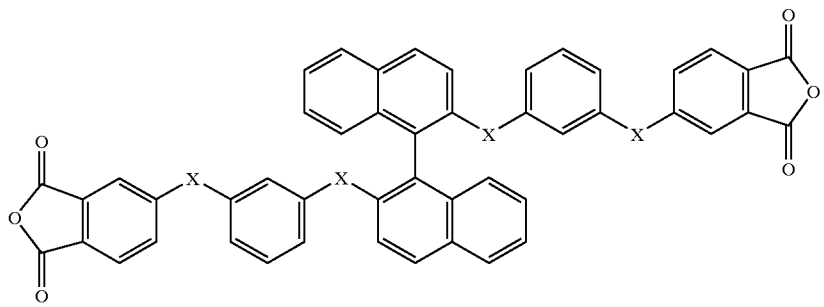

where each X is the same or different and is selected from O, $CH_2$, CO, $SO_2$, $CF_2$, $C(CH_3)_2$, $C(CF_3)_2$, $C(Ph)(CF_3)$, or nil. It will be appreciated that "Ph" represents a phenyl group, i.e. $C_6H_5$, as is generally known in the art.

In another embodiment, an addition-cured polyimide is provided comprising the reaction product of an aromatic dianhydride; a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride; and a 2,2'-biaryl diamine selected from the group consisting of:

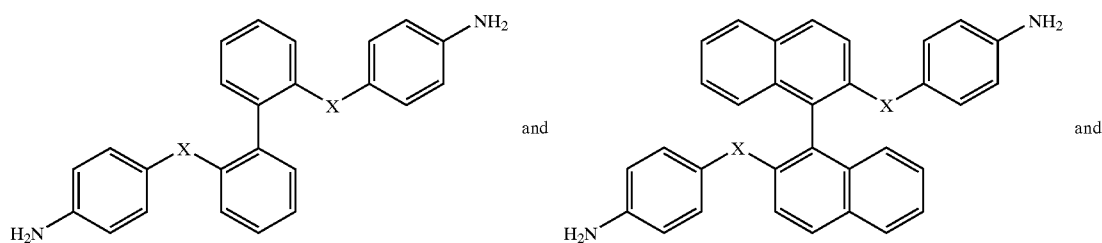

and

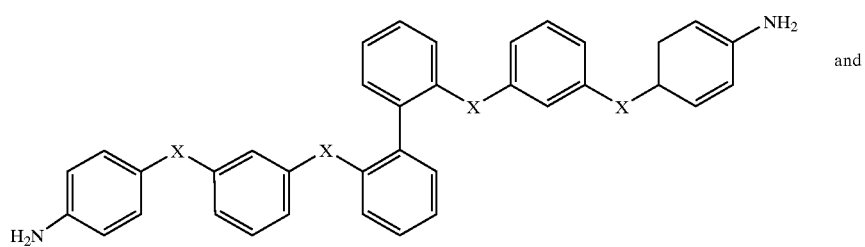

and

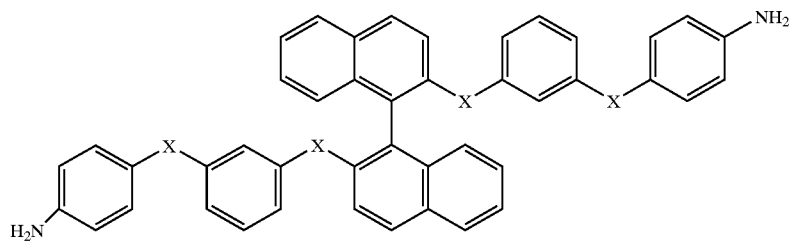

where each X is the same or different and is selected from O, $CH_2$, CO, $SO_2$, $CF_2$, $C(CH_3)_2$, $C(CF_3)_2$, $C(Ph)(CF_3)$, or nil.

In yet another embodiment of the present invention is provided in addition-cured polyimide comprising the reaction product of a 2,2'-biaryl anhydride selected from the group consisting of:

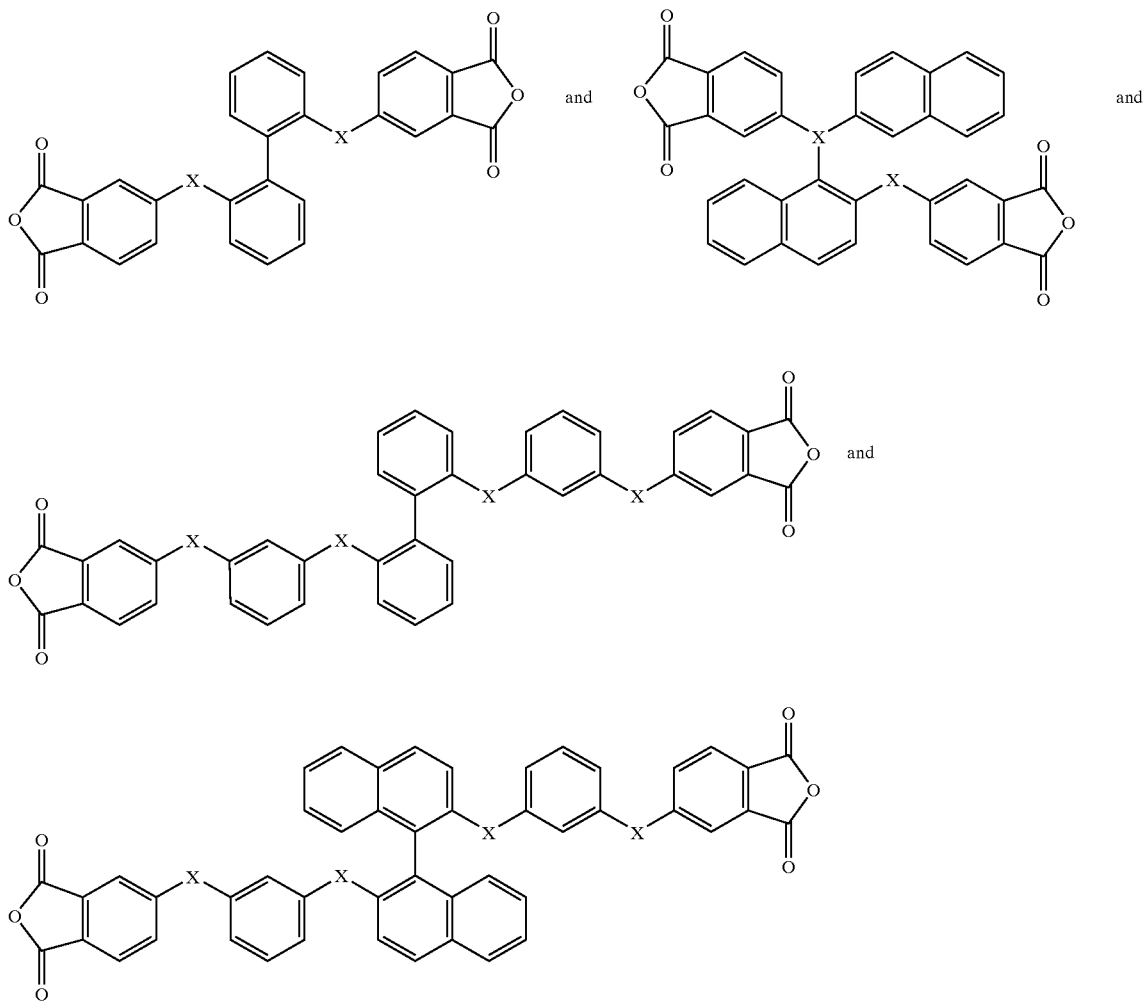
and
a 2,2'-biaryl diamine selected from the group consisting of:
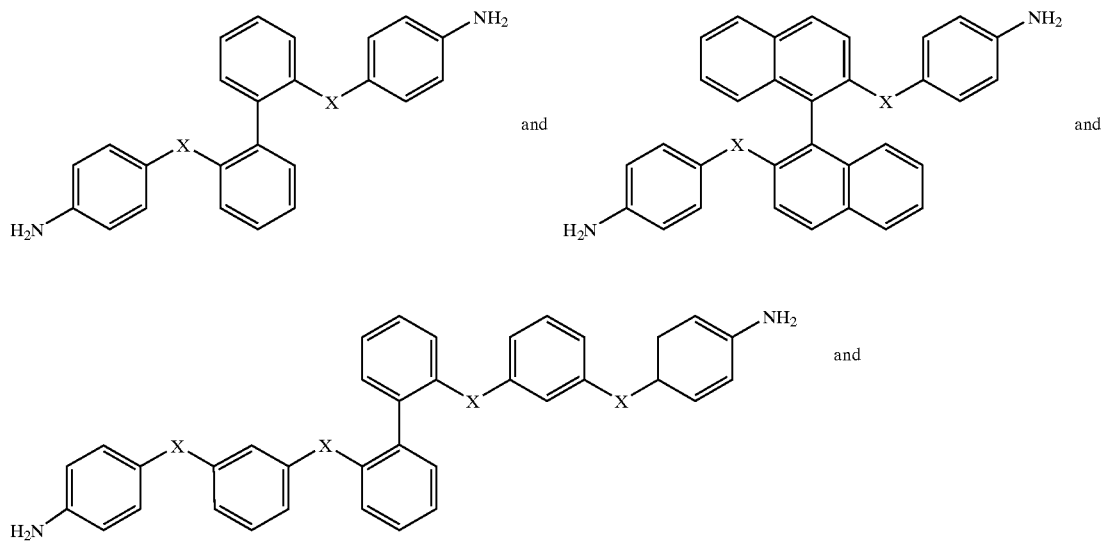

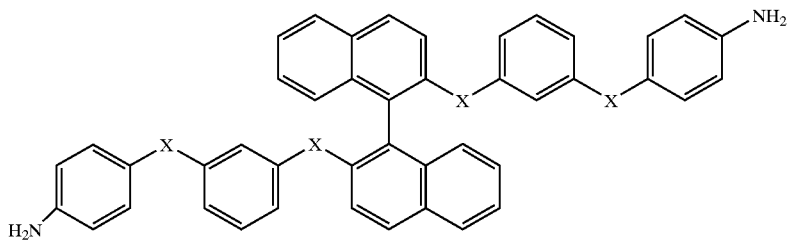

where each X is the same or different and is selected from O, $CH_2$, CO, $SO_2$, $CF_2$, $C(CH_3)_2$, $C(CF_3)_2$, $C(Ph)(CF_3)$, or nil; and a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride.

In still a further embodiment of the present invention is provided an addition-cured polyimide according to the following structure:

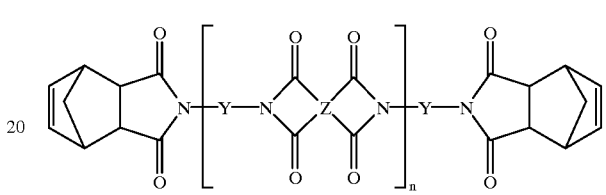

wherein n is from 1 to 10, and Z is selected from the group consisting of aromatic dianhydride radicals, and the following structures:

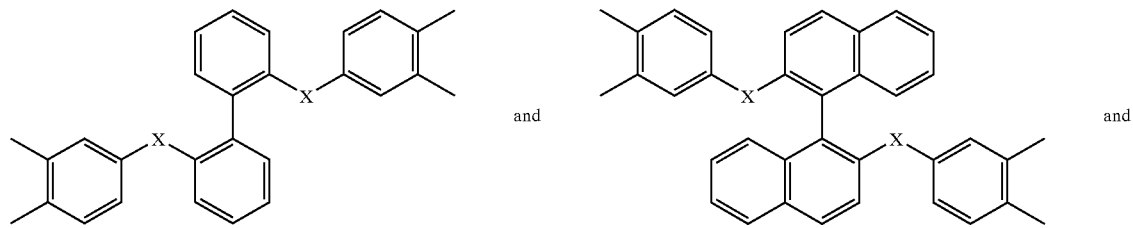

and

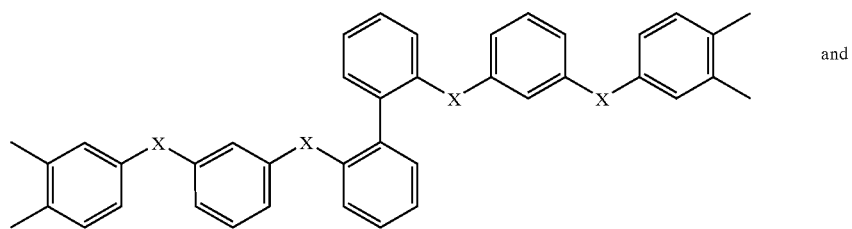

and

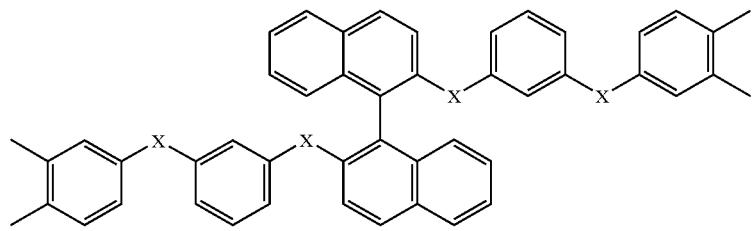

and Y is selected from the group consisting of aromatic diamine radicals, and the following structures:

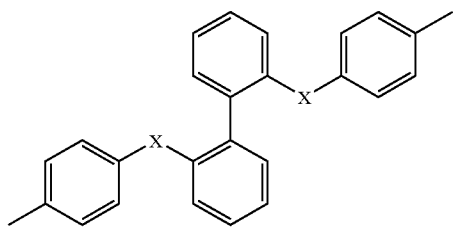 and 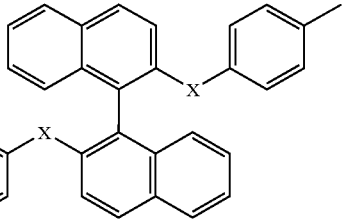

and

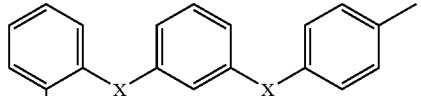

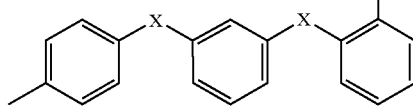 and

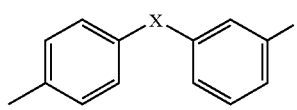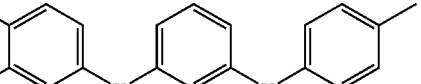

where each X is the same or different and is selected from O, $CH_2$, CO, $SO_2$, $CF_2$, $C(CH_3)_2$, $C(CF_3)_2$, $C(Ph)(CF_3)$, or nil, with the proviso that at least one of Z or Y is selected from the given 2,2'-biaryl structures.

DETAILED DESCRIPTION OF THE DRAWINGS

FIG. 1. PMR-type polyimides synthesized in the Design of Experiments (DOE) study.

Figure 2:
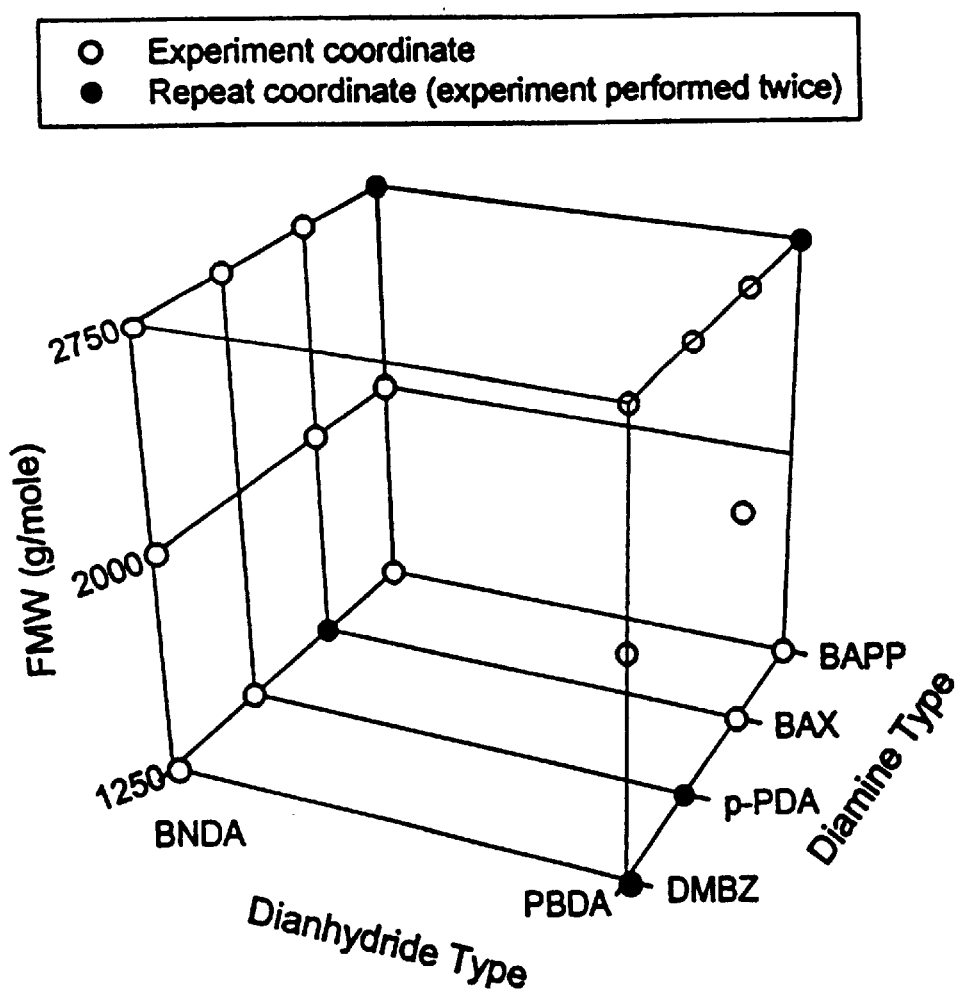

FIG. 2. The experiment coordinates for the Design of Experiments study.

Figure 3:
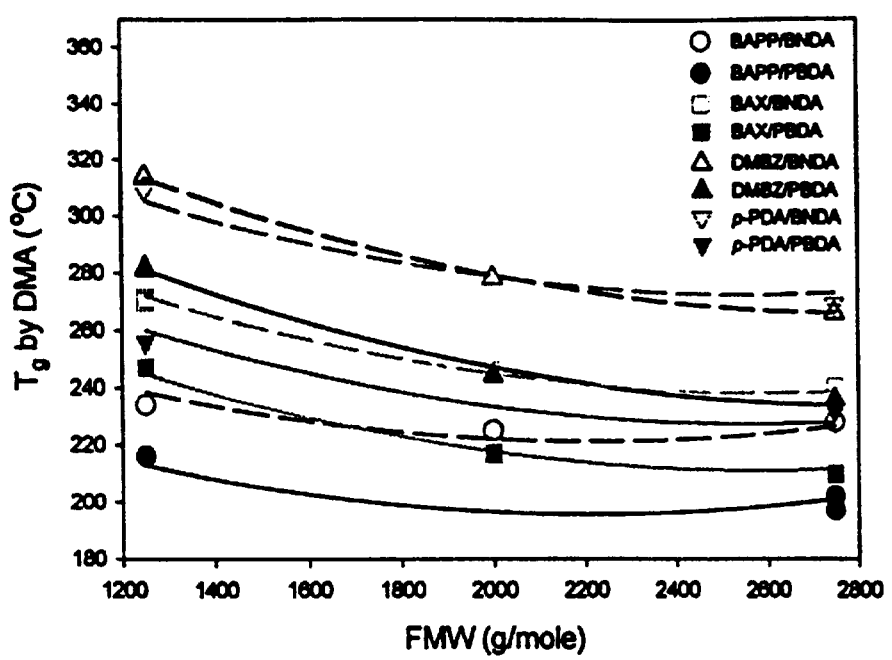

FIG. 3. DOE model fitted curves for $T_g$ determined by DMA. Each symbol represents an experimentally determined value.

Figure 4:
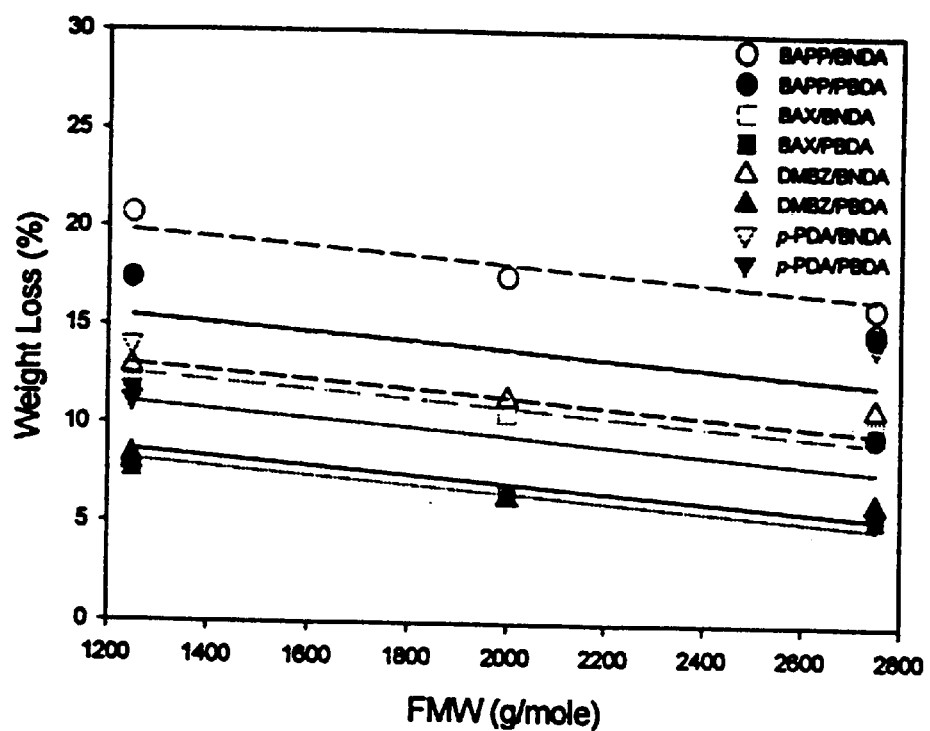

FIG. 4. DOE model fitted curves for weight loss at 288° C. (1038 hrs.). Each symbol represents an experimentally determined value.

Figure 5:
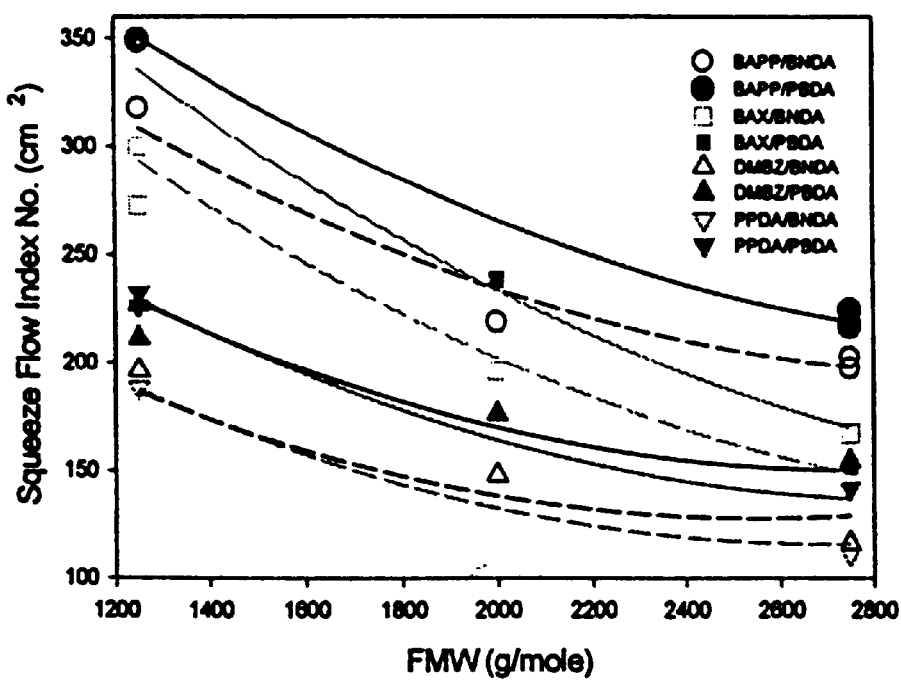

FIG. 5. DOE model fitted curves for melt flow (Squeeze Flow Index No.). Each symbol represents an experimentally determined value.

DETAILED DESCRIPTION OF THE INVENTION

High temperature polyimides, such as the NASA-GRC developed PMR-15, are becoming an increasingly important class of materials for a variety of aerospace applications, including aircraft engine, propulsion, and airframe components. Use of these materials could lead to substantial weight reductions and therefore lower operating costs with higher load capacities. To enable widespread utilization, an economical alternative to the traditional processing methods must be developed. Resin Transfer Molding (RTM) provides such an economical advantage, but existing polyimides systems cannot be RTM processed in the melt state. The purpose of the present invention is to develop new PMR-type polyimides that have melt viscosities low enough to enable RTM processing and that have acceptable stability and high temperature properties at operation temperatures above 232° C.

Generally, PMR-type polyimide resins of this invention differ from traditional PMR-type polyimide resins in that they contain novel, flexible linkages in their backbone structures. These backbones provide less rigid PMR-type polyimides, which exhibit lowered melt viscosities as compared to traditional PMR-type polyimides known in the art. In the preferred embodiment of the present invention, 2,2'-biaryl monomers are utilized to create this flexible linkage in the PMR backbone.

Prior art PMR-type polyimides are created by the reaction of diamines with dianhydrides, in low boiling point solvents such as methanol or ethanol and the like. The molecular weight of such polyimides is kept low (for example, MW=1500 in conventional PMR-15) by using endcaps such as nadic anhydride. In the present invention, the same process may be used employing different diamines and dianhydrides to create PMR-type polyimides that exhibit lower melt viscosity than those PMR-type polyimides of the prior art. Specifically, the diamines and dianhydrides utilized are 2,2'-biaryl monomers, and their use results in the formation of a PMR-type polyimide having a less rigid backbone due to the use of these kinked and twisted or non-coplanar moieties.

In a first embodiment of the present invention, only the dianhydride monomers are 2,2'-biaryl monomers, while the diamine monomers may be virtually any aromatic diamine useful in producing PMR-type polyimides. In a second embodiment of the present invention, only the diamine monomers are 2,2'-biaryl monomers, while the dianhydride monomers may be virtually any aromatic dianhydride useful in producing PMR-type polyimides. In a third embodiment of the present invention, both the diamine and dianhydride monomers are 2,2'-biaryl monomers. Notably, useful endcaps remain the same across each embodiment.

Useful endcaps are selected from the group consisting of nadic, including its ester or anhydride derivatives, and 4-phenylethynylphthalic anhydride. These reactive end groups include 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride.

In the first embodiment of the present invention, wherein the diamine monomer does not have a 2,2'-disubstituted biaryl structure, the diamine may be selected from virtually any aromatic diamine useful in the production of PMR-type polyimides. Useful, non-limiting examples of diamine monomers for use in this embodiment include p-phenylene diamine, methylene dianiline, 2,2'-dimethylbenzidine, alpha,alpha'-Bis(4-aminophenyl)-p-zylene (BAX), 2,2-Bis (4-aminophenoxy phenyl) propane (BAPP).

In the second and third embodiments of the present invention, wherein the diamine employed has a 2,2'-disubstituted biaryl structure, the diamine monomer is selected from the group consisting of diamines having the following structures:

where each X is the same or different and is selected from the group consisting of O, $CH_2$, CO, $SO_2$, $CF_2$, $C(CH_3)_2$, $C(CF_3)_2$, $C(Ph)(CF_3)$, or nil. It will be appreciated that "Ph" represents a phenyl group, i.e. $C_6H_5$, as is generally known in the art.

In the second embodiment of the present invention, wherein the dianhydride monomer does not have a 2,2'-biaryl structure, the dianhydride may be selected from virtually any aromatic dianhydride useful in the production PMR-type polyimides. Useful, non-limiting examples of these dianhydrides include pyromellitic dianhydride, 3,3',4, 4'-benzophenone tetracarboxylic acid dianhydride, and biphenyl dianhydride.

In the first and third embodiments of the present invention, wherein the dianhydride monomer has a 2,2'-disubstituted biaryl structure, the dianhydride monomer is selected form dianhydrides having the following structures:

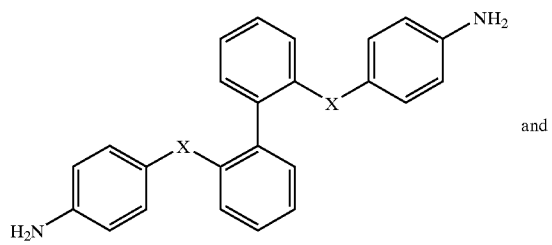 and 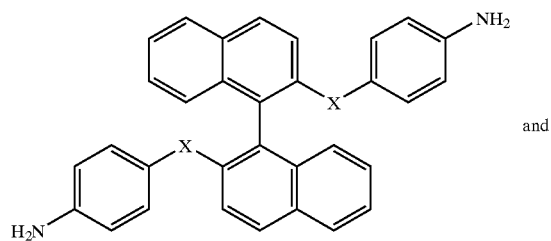 and

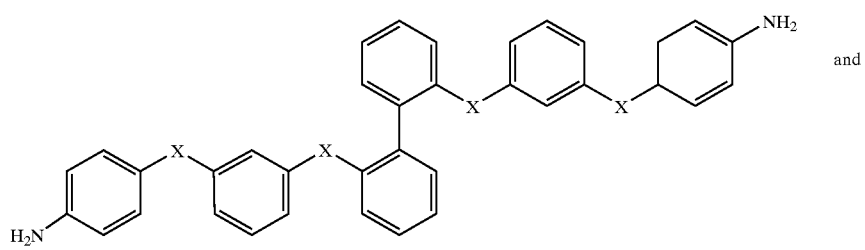 and

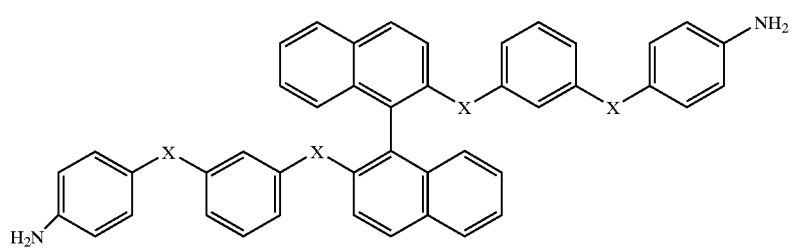

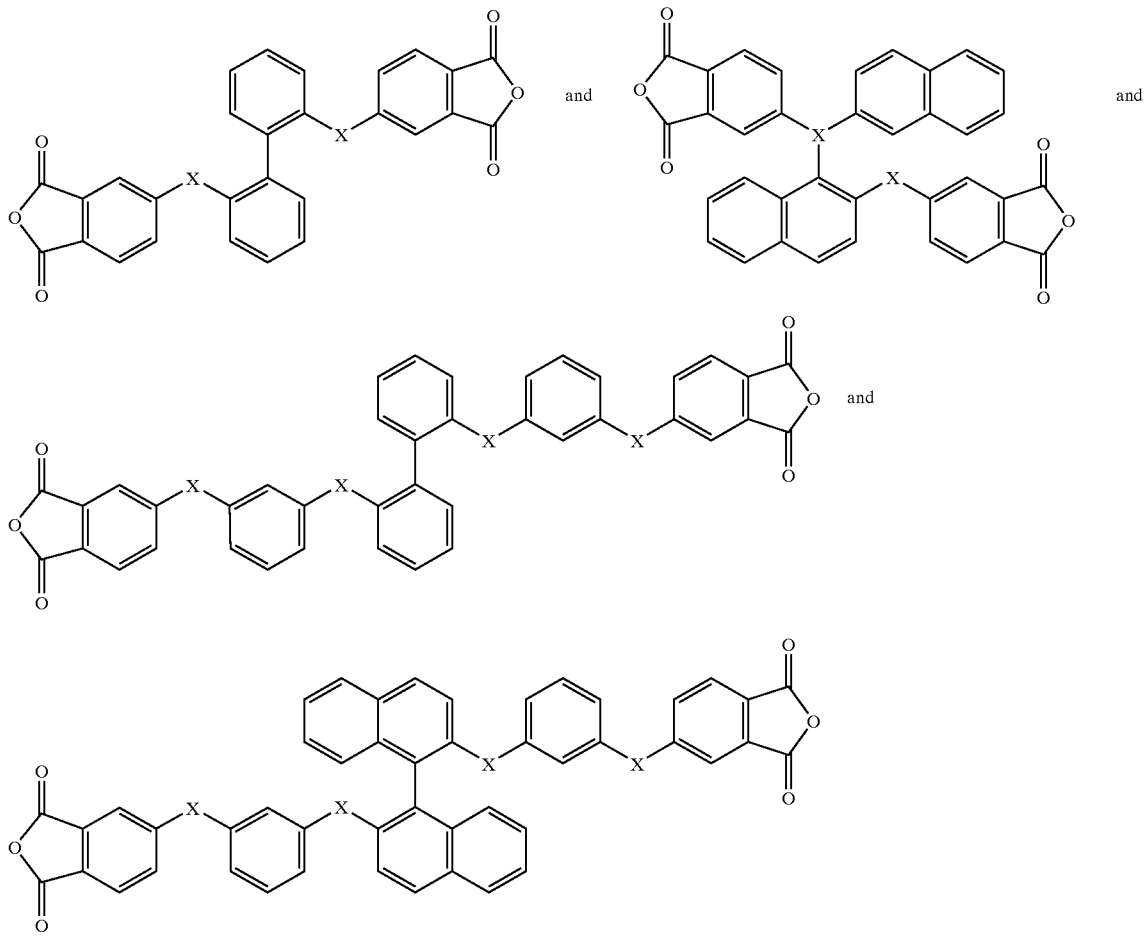

where each X is the same or different and is selected from the group consisting of O, $CH_2$, CO, $SO_2$, $CF_2$, $C(CH_3)_2$, $C(Ph)(CF_3)$, or nil.

In light of the foregoing, it should be apparent that the embodiments disclosed herein encompass a composition of matter having the following structure:

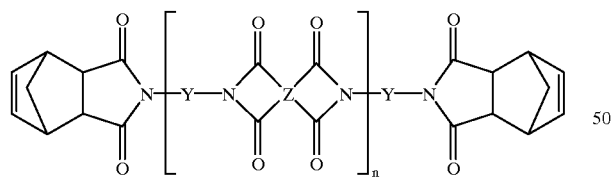

wherein n is 1 to 10, Z is selected from the group consisting of aromatic dianhydride radicals, and the following structures:

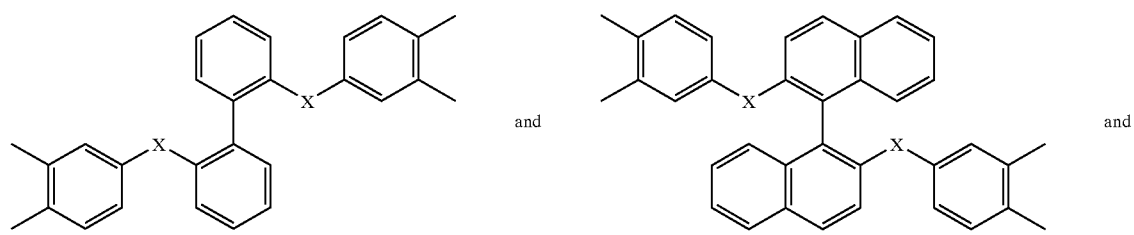

-continued

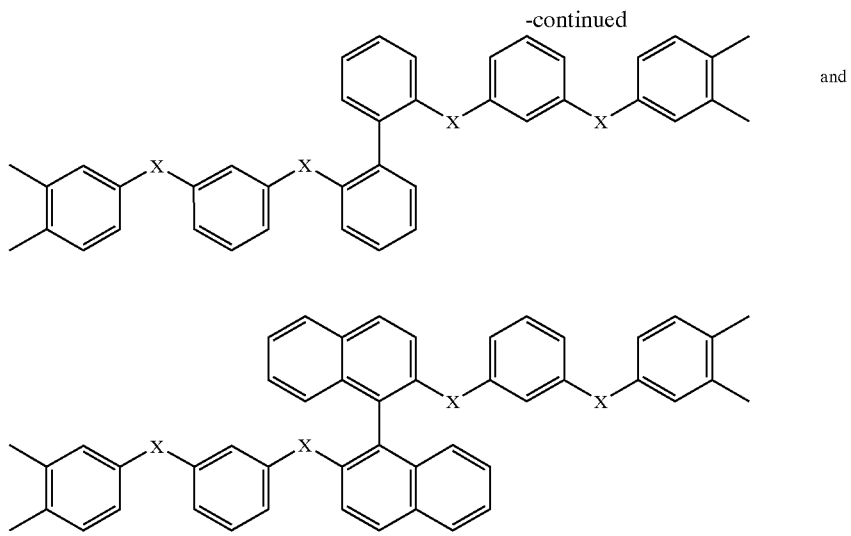

and and Y is selected from the group consisting of aromatic diamine radicals, and the following structures:

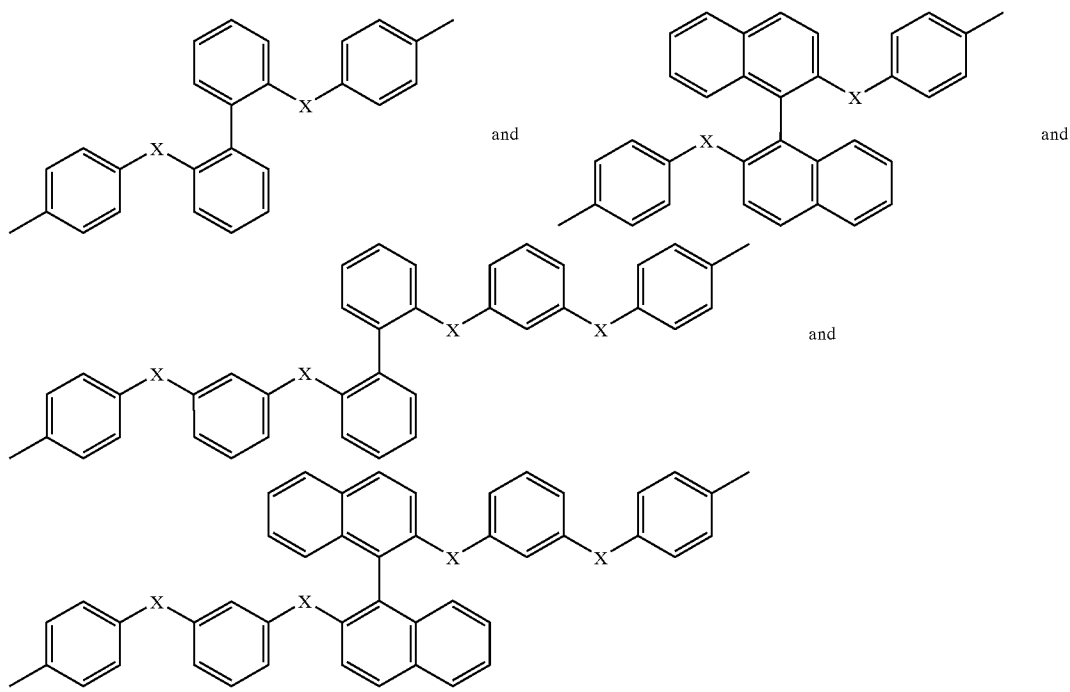

and and and where each X is the same or different and is selected from O, $CH_2$, CO, $SO_2$, $CF_2$, $C(CH_3)_2$, $C(CF_3)_2$, $C(Ph)(CF_3)$, or nil, with the proviso that at least one of Z or Y is selected from the given 2,2'-biaryl structures.

A significant benefit of using the PMR approach in the production of polyimides is that, for a given set of monomer reactants, a series of PMR-type polyimides can be formulated simply by changing the molar ratio of each monomer reactant. For example, the molecular weight of the typical linear PMR-type polyimide can be varied depending upon the ratio of the monomer reactants by selecting the molecular weight (n) of the dianhydride or the molecular weight of the diamine (n+1). The molar ratio of the nadic end group will always be 2 in these linear addition-cured polyimides. Thus, the ratio of end group: diamine: dianhydride will be 2:(n+1):n. In theory, the formulated molecular weight of the polyimide will determine its cross-linked density and is, therefore, thought to be an important parameter controlling the processing characteristics, physical properties, and mechanical properties of a PMR-type polyimide.

Particularly preferred 2,2'-disubstituted biaryl dianhydrides include 2,2'-Bis(3,4-dicarboxyphenoxy)1,1'-binaphthyl dianhydride (BNDA), 2,2'-bis(3,4-dicarboxyphenoxy) 1,1'-biphenyl dianhydride (PBDA), 2,2'-Bis(4-(3,4-dicarboxyphenoxy)phenoxy biphenyl, 2,2'-Bis (4-(3,4-dicarboxyphenoxy)phenoxy binaphthyl.

Particularly preferred 2,2'-disubstituted biaryl diamines include 2,2'-Bis(4-aminophenoxy)biphenyl, 2,2'-Bis(4- aminophenoxy)binaphthyl, 2,2'-Bis(4-(4-aminophenoxy) phenoxy)biphenyl, and 2,2'-Bis(4-(4-aminophenoxy) phenoxy)binaphthyl.

The PMR-type polyimides of the present invention may be synthesized through any known method. Two particularly useful methods include solvent polymerization and melt polymerization.

In the preparation of PMR-type polyimides through solvent polymerization, an organic solvent is employed to dissolve the dianhydride and diamine monomers. The solvent is chosen so as not to react with the diamines or dianhydrides during processing. Non-limiting examples of suitable solvents include N,N-dimethylformamide, N,N-dimethylacetamide, dimethyl sulfoxide, methylpyrrolidone, aliphatic alcohols, aliphatic alcohol-ethers and alkylbenzenes such as xylene. Mixtures of two or more solvents may also be employed.

Upon heating these solutions to a temperature of from about 50° C. to about 150° C., the monomers react to form prepolymers having an average molecular weight in the range of 1000 to 10,000. Subsequently, the prepolymers may be heated to a temperature of from about 200° C. to about 300° C., and the endcaped portion of the molecule will become reactive, and chain extension and cross-linking reactions will occur to form high molecular weight thermally stable polyimides.

In melt polymerization, the diamine (n+1 equivalence), dianhydride (n equivalence), and Naendcap (2 equivalence) are ground and thoroughly mixed with a mortar and pestle. The dry monomer mixture is poured into an air-circulated vessel and heated to a temperature of from about 200° C. to about 235° C. for a time from about 0.5 to about 2.0 hours. The mixture is then cooled to room temperature and ground into a fine powder.

The resultant powder is placed in a mold and heated to a temperature of from about 200° C. to about 250° C. Contact pressure is provided, for example, by a steel punch, until a pressure of from about 100 to about 300 psi is reached. This pressure is maintained for about 1 to about 6 hours. Notably, once pressure is applied, the temperature is increased to between 250° C. to about 370° C. The heat and pressure produces a molded product.

The molded product may be postcured by ramping to a temperature of from about 300° C. to about 370° C., and maintaining this temperature for about 4 to about 16 hours.

The production of high temperature polymer matrix composites from polyimide prepolymers is well known in the art. However, due to the extremely high viscosity of the PMR-type polyimides, molding techniques within the prior art were limited and extremely costly. Advantageously, the polyimides of the present invention can be processed using resin transfer molding techniques. This is due to the fact that the melt viscosity of the PMR-type polyimides produced from 2,2'-disubstituted biaryl diamine monomers and/or 2,2'-disubstituted biaryl dianhydride monomers is significantly reduced. Particularly, the melt viscosity of PMR-type polyimides according to the present invention has been found to generally arrange below 4,000 centipoise (cP).

As the following Experimental section shows, new PMR-type polyimide resins have been developed that are suitable for RTM processing. Many of the new formulations possess melt viscosities lower than 1000 cP, and they show an increase in processability over industry standards (PMR-15 and AMB-21). Several of the DMBZ and p-PDA resins have higher $T_a g$'s, TOS, and melt flows compared to AMB-21. The best performing system is the PBDA/BAX/NA, FMW= 1250 g/mole with high melt flow (SFI number=350 cm$^2$), good TOS (comparable to PMR-15), and acceptable $T_g$ (250° C.).

These new polyimide resins can be used as matrix resins in polyimide/carbon fiber composites. Due to their high strength and low density, such composites may be very useful as aircraft components and could reduce the weight of such components by about fifty percent.

Experimental

Materials 2,2'-Bis(3,4-dicarboxyphenoxy)1,1'-biphenyl dianhydride (PBDA) was prepared as described by Liou, et al., in *J. Polym. Sci.; Part A.: Polym. Chem.* 1998, 36, 2021. 2,2'-Bis(3,4-dicarboxyphenoxy)1,1'-binaphthyl dianhydride (BNDA) was prepared as described by Liou, *J. Polym. Sci.; Part A.: Polym. Chem.* 1998, 36, 1937. Bisaniline xylene (BAX) was synthesized by Dr. David Klopotek at St. Norbert College, DePere, Wis. Methylene dianiline (MDA) was purchased from Dexter Corporation. BAPP and DMBZ (1) were purchased from Wakayama Seika Kogyo Company, and BTDA, NA, and p-PDA (1) were purchased from Chriskev Company.

Instrumentation

Glass transition temperatures ($T_a g$'s) were measured on a DuPont Instruments Thermomechanical Analyzer 800 (TMA) with expansion probe (heating rate of 10° C./min., air purge, 1 g load) and on a TA DMA 2980 Dynamic Mechanical Analyzer with single cantilever clamp (2.5° C./min., 1 Hz frequency). Infrared spectra were obtained on a Nicolet Model 510P Fourier Transform Infrared Spectrometer (FTIR), and thermogravimetric analyses (TGA) were performed on a TA Model 2950 TGA (10° C./min., air purge). Differential Scanning Calorimetry was performed on a DuPont Instruments 910 DSC with a pressure DSC cell ($N_2$, 200 psi.).

Molding Powder Preparation

With a mortar and pestle, diamine (n +1 equivalents), dianhydride (n equivalents), and NA endcap (2 equivalents) were ground until thoroughly mixed. The dry monomer mixture was poured into a glass jar and heated at 232° C. for 1 hr. in an air-circulating oven. After cooling to room temperature, the rigid resin was ground into a fine powder. FTIR, TGA, and DSC confirmed complete imidization.

Neat Resin Processing

The molding powder (1.25 g) was placed in a 2.54 cm diameter steel mold and heated to 300° C. Then, the steel punch was placed in the mold, and contact pressure was applied until 316° C. when 17 MPa was applied (2 hr. dwell time). The resulting disks were cut into pieces then postcured by ramping to 329° C. and holding there for 12 hr.

Isothermal Aging

Pieces of the postcured neat resin disk (about 2.4 cm$^2$) were aged for 1038 hrs. at 288° C. in an air-circulating oven (100 cm$^3$/min. airflow). Samples were withdrawn after 250, 548, 798, and 1038 hr., placed in a desiccator while cooling to room temperature, and weighed (+/−0.0001 g).

Squeeze Tests

Molding powder (0.50 g) was squeezed between two sheets of Kapton® in a preheated press (316° C.) with 1.2 MPa. After 2.0 minutes, the resulting splat was taken out of the press, and the average diameter was measured using digital analysis. The Squeeze Flow Index (SFI) number was calculated as the square of the diameter.

Design of Experiments

A Design of Experiments (DOE) study was performed on the new polyimide family to optimize processability and high temperature performance.

The DOE approach was used to optimize the dianhydride/ diamine type, formulated molecular weight (FMW), $T_g$, TOS, and melt viscosity. Several independent variables were considered for the DOE study: The discrete variables were diamine and dianhydride types, and the continuous variable was FMW. The measured dependent variables were $T_g$, weight loss (a measure of TOS), and SFI number.

FIG. 1 shows the PMR-type polyimides synthesized in this study. The anhydride endcap for all formulations was 5-Norbornene-2,3-dicarboxylic anhydride (NA). PMR-15 (MDA/BTDA/NA, FMW=1500 g/mole) and AMB-21 (BAPP/BTDA/NA, FMW=2100 g/mole) were the controls.

FIG. 2 displays the experiment coordinates in the D-Optimal statistical design, a total of 21 runs and 5 replicates. This design maximized the amount of information from the computer-generated set of experiments with respect to a specified regression model.

Results and Discussion

Glass transition temperatures for the DOE resins are displayed along with model fitted curves in FIG. 3 (±13° C. average error, 95% confidence level). Most of the p-PDA, DMBZ, and BAX formulations are acceptable for use temperatures above 232° C. As a comparison, PMR-15 neat resin disks display a $T_g$ of 343° C., and AMB-21 disks display a $T_g$ of 277° C.

In FIG. 4, the weight loss model fitted curves are shown (1038 hrs. at 288° C.). For comparison purposes, PMR-15 had a weight loss of 4.8% and AMB-21 had a weight loss of 6.8% at 250 hrs. With the average error being ±0.94 weight % at a 95% confidence level, many of the p-PDA, DMBZ, and BAX formulations had weight losses lower than AMB-21 and comparable to PMR-15.

Improving the processability and lowering the melt viscosity of PMR-type resin remained the primary goal of these experiments. To determine the melt viscosity of these thermosetting resins, the Squeeze Test was employed where 0.50 g of molding powder was squeezed in a press between sheets of Kapton® at 35 MPa for 2.0 minutes. The square of the diameter of the resulting splat was the SFI number. Higher SFI numbers correspond to higher melt flows. PMR-15 and AMB-21, typical PMR-type resins used in industry, have SFI numbers of only 91 cm$^2$ and 142 cm$^2$, respectively. By substituting PBDA into the PMR-15 scheme (instead of BTDA), the SFI number dramatically increased to 250 cm$^2$.

FIG. 5 displays the model fitted curves of SFI number for the DOE resin systems (±38 cm$^2$, 95% confidence level). Almost all of the formulations possess higher melt flows than both controls due to the incorporation of 2,2'-biaryl. Based on silicone standards, the RTM limit of 1000 cP approximately corresponds to a SFI number of 230 cm$^2$. It appears that BAX and BAPP formulations are suitable for RTM processing.

What is claimed is:

1. An addition-cured polyimide comprising:
   crosslinked linear polyimides, wherein said linear polyimides are the reaction product of:
   an aromatic diamine;
   a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride; and
   a 2,2-biaryl dianhydride selected from the group consisting of:

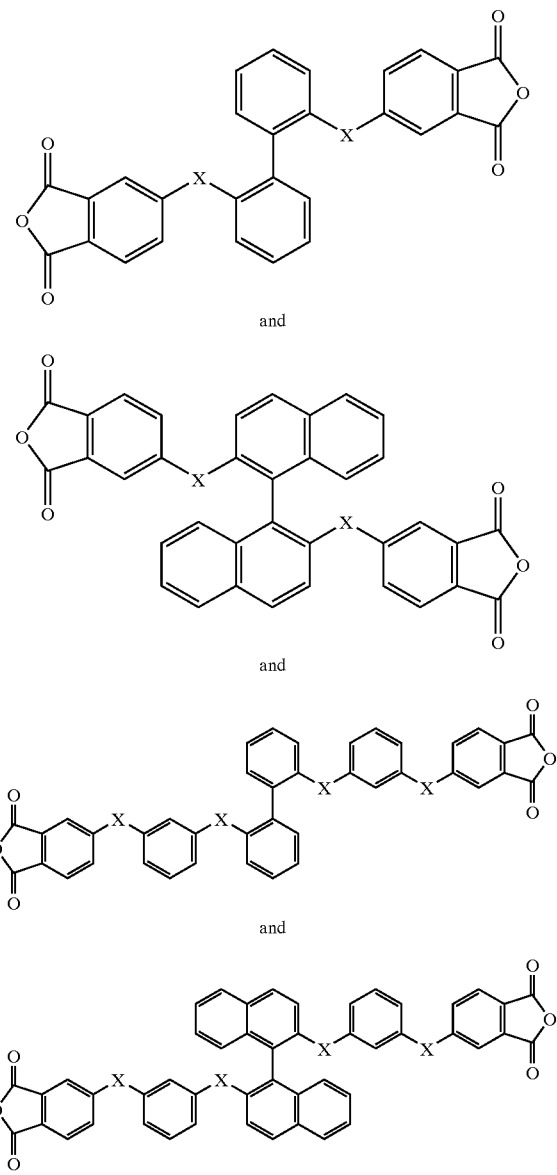

and and and where each X is the same or different and is selected from O, CH$_2$, CO, SO$_2$, CF$_2$, C(CH$_3$)$_2$, C(CF$_3$)$_2$, C(Ph)(CF$_3$), or nil.

2. The polyimide of claim 1, wherein the 2,2'-biaryl dianhydride is selected from the group consisting of 2,2'-bis(3,4-dicarboxyphenoxy) 1,1'-biphenyl dianhydride and 2,2'-bis (3,4-dicarboxyphenoxy) 1,1'-binaphthyl dianhydride, 2,2-Bis(4-(3,4-dicarboxyphenoxy)phenoxy biphenyl, and 2,2'-Bis(4-(3,4-dicarboxyphenoxy) phenoxy binaphthyl.

3. An addition-cured polyimide comprising:
   crosslinked linear polyimides, wherein said linear polyimides are the reaction product of:
   an aromatic dianhydride;
   a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride; and
   a 2,2'-biaryl diamine selected from the group consisting of:

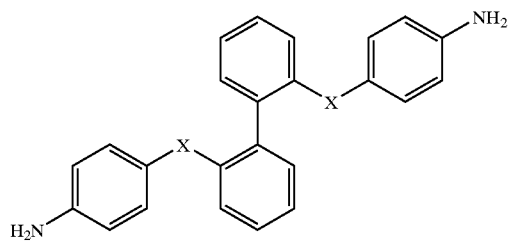

and

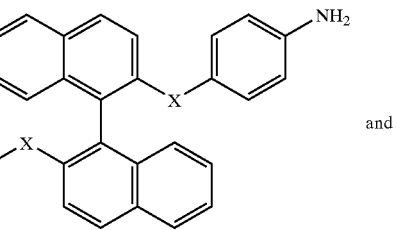

and

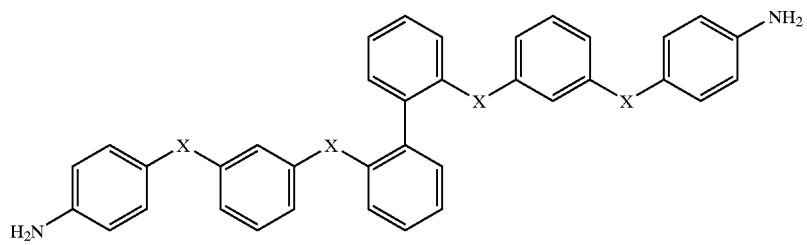

and

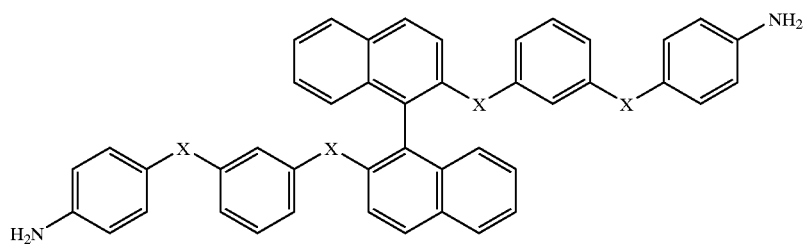

where each X is the same or different and is selected from O, CH₂, CO, SO₂, CF₂, C(CH₃)₂, C(CF₃)₂, C(Ph)(CF₃), or nil.

4. An addition-cured polyimide comprising:
crosslinked linear polyimides, wherein said linear polyimides are the reaction product of:
a 2,2'-biaryl dianhydride selected from the group consisting of:

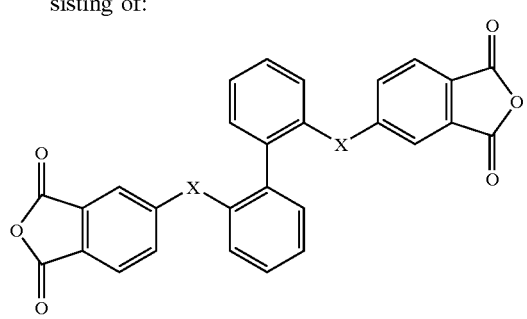

and

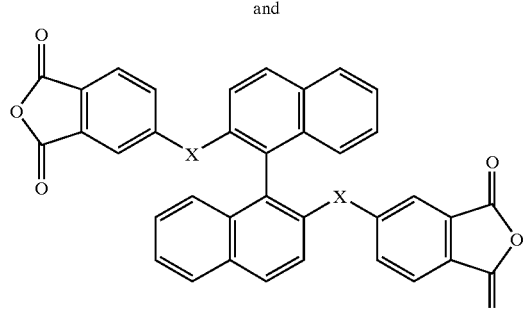

-continued
and

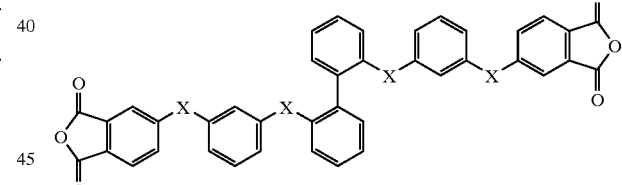

and

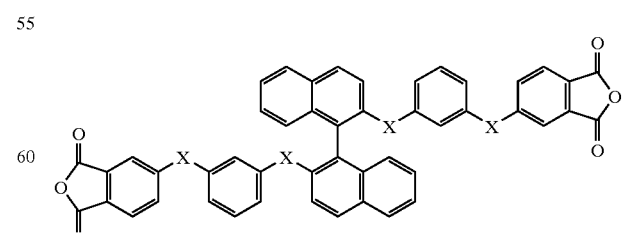

a 2,2-biaryl diamine selected from the group consisting of:

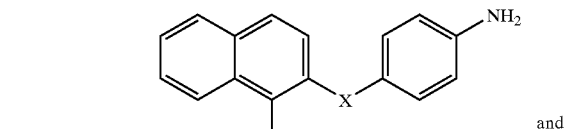

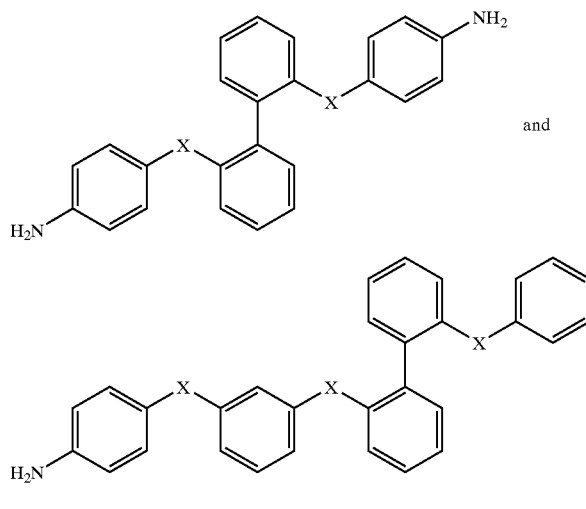

where each X is the same or different and is selected from O, CH₂, CO, SO₂, CF₂, C(CH₃)₂, C(CF₃)₂, C(Ph)(CF₃), or nil; and a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride.

5. The polyimide of claim 4, wherein the 2,2-biaryl dianhydride is selected from the group consisting of 2,2'-bis(3,4-dicarboxyphenoxy) 1,1'-biphenyl dianhydride and 2,2-bis (3,4-dicarboxyphenoxy) 1,1'-binaphthyl dianhydride, 2,2-Bis(4-(3,4-dicarboxyphenoxy) phenoxy biphenyl, and 2,2'-Bis(4-(3,4-dicarboxyphenoxy)phenoxy binaphthyl.

6. An addition-curable polyimide according to the following structure (I):

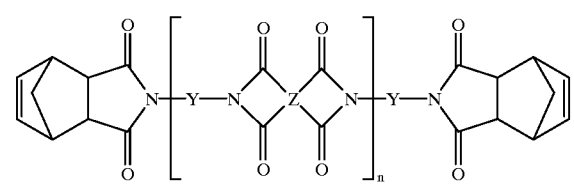

wherein n is 1 to 10, Z is selected from the group consisting of aromatic dianhydride radicals, and the following structures:

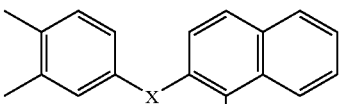

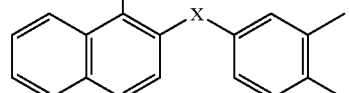

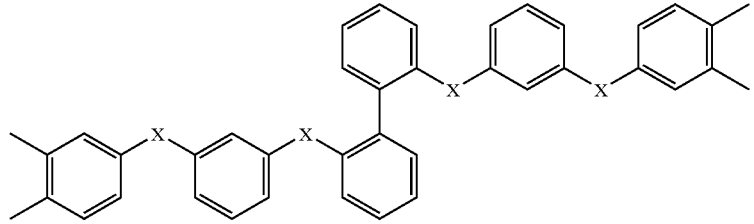

-continued

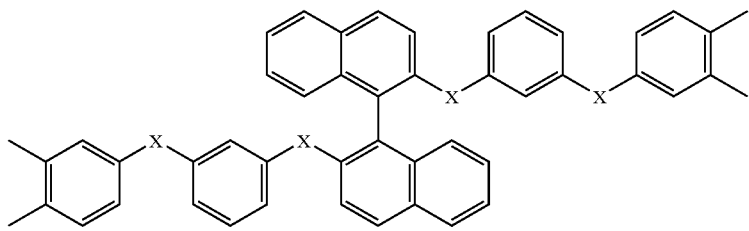

and Y is selected from the group consisting of aromatic diamine radicals, and the following structures:

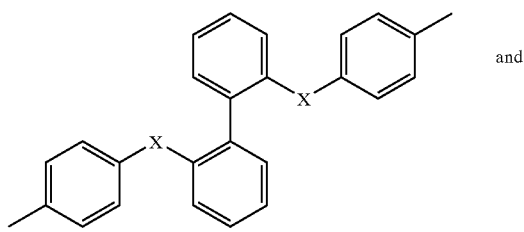 and

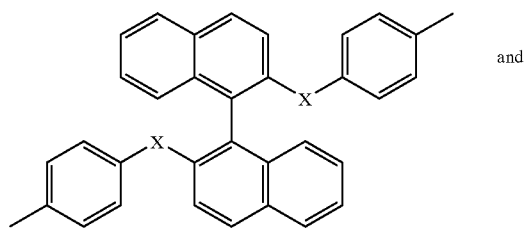 and

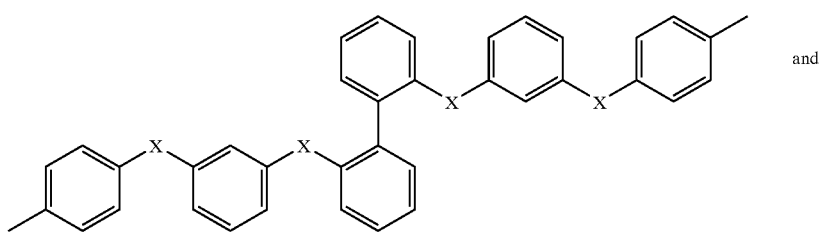 and

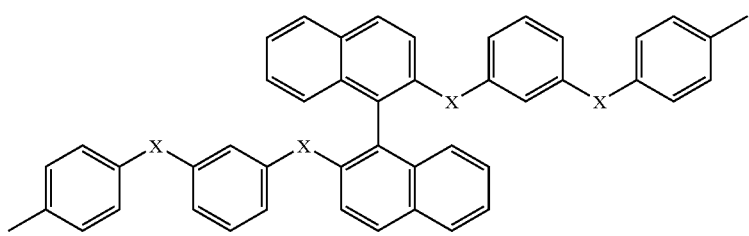

where each X is the same or different and is selected from O, CH₂, CO, SO₂, CF₂, C(CH₃)₂, C(CF₃)₂, C(Ph)(CF₃), or nil, with the proviso that at least one of Z or Y is selected from the given 2,2'-biaryl structures.

7. The polyimide of claim 6, wherein the 2,2'-biaryl dianhydride is selected from the group consisting of 2,2'-bis(3,4-dicarboxyphenoxy) 1,1'-biphenyl dianhydride and 2,2-bis(3,4-dicarboxyphenoxy) 1,1'-binaphthyl dianhydride, 2,2-Bis(4-(3,4-dicarboxyphenoxy) phenoxy biphenyl, and 2,2'-Bis(4-(3,4-dicarboxyphenoxy)phenoxy binaphthyl.

8. An addition-cured polyimide comprising:
linear polyimides, wherein said linear polyimides are the reaction product of:
an aromatic diamine;
a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride; and a 2,2'-biaryl dianhydride selected from the group consisting of:
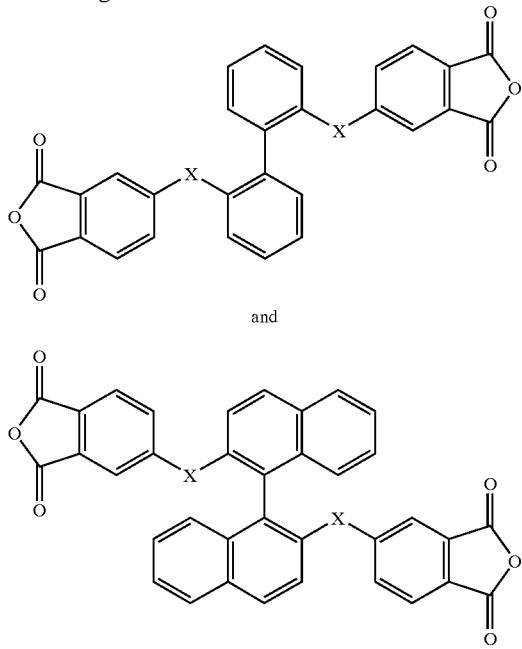
and
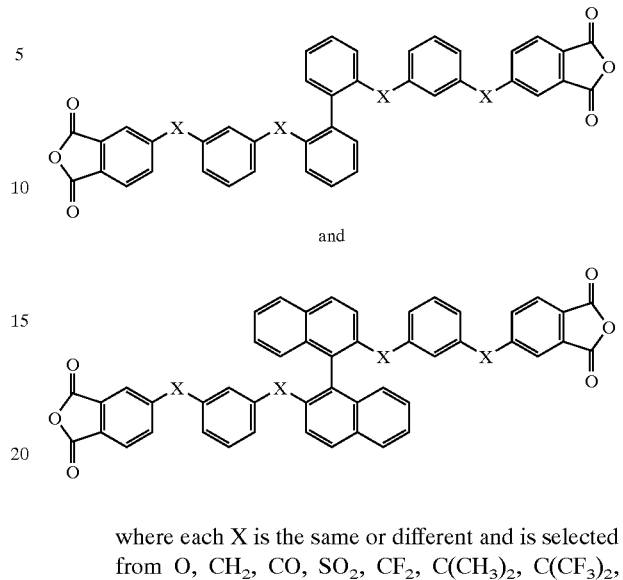
where each X is the same or different and is selected from O, $CH_2$, CO, $SO_2$, $CF_2$, $C(CH_3)_2$, $C(CF_3)_2$, $C(Ph)(CF_3)$, or nil, wherein the addition-cured polyimide has a melt viscosity of less than about 4000 centipoise (cP).
* * * * *

UNITED STATES PATENT AND TRADEMARK OFFICE
CERTIFICATE OF CORRECTION

PATENT NO. : 6,642,348 B2
DATED : November 4, 2003
INVENTOR(S) : Eby et al.

It is certified that error appears in the above-identified patent and that said Letters Patent is hereby corrected as shown below:

Column 20,
Line 52, "bis(3,4-dicarboxyphenoxy) 1,1'-biphenyl dianhydride and" should read
-- bis(3,4-dicarboxyphenoxy)1,1'-biphenyl dianhydride; --
Line 53, "2,2'-bis (3,4-dicarboxyphenoxy) 1,1'-binaphthyl" should read -- 2,2'-bis(3,4-dicarboxyphenoxy)1,1'-binaphthyl --
Line 54, "dianhydride, 2,2-Bis(4-(3,4-dicarboxyphenoxy)phenoxy" should read
-- dianhydride; 2,2'-bis(4-(3,4-dicarboxyphenoxy)phenoxy) --
Line 55, "biphenyl, and 2,2'-Bis(4-(3,4-dicarboxyphenoxy) phenoxy" should read
-- biphenyl; and 2,2'-bis(4-(3,4-dicarboxyphenoxy)phenoxy) --

Column 23,
Line 40, "2,2-biaryl" should read -- 2,2'-biaryl --
Line 42, "bis(3,4-dicarboxyphenoxy) 1,1'-biphenyl dianhydride and" should read -- bis(3,4-dicarboxyphenoxy)1,1'-biphenyl dianhydride; --
Line 43, "2,2-bis (3,4-dicarboxyphenoxy) 1,1'-binaphthyl" should read -- 2,2'-bis(3,4-dicarboxyphenoxy)1,1'-binaphthyl --
Line 44, "dianhydride, 2,2-Bis(4-(3,4-dicarboxyphenoxy) phenoxy" should read
-- dianhydride; 2,2'-bis(4-(3,4-dicarboxyphenoxy)phenoxy) --
Line 45, "biphenyl, and 2,2'-Bis(4-(3,4-dicarboxyphenoxy)phenoxy" should read
-- biphenyl; and 2,2'-bis(4-(3,4-dicarboxyphenoxy)phenoxy) --

Column 25,
Line 66, "bis(3,4-dicarboxyphenoxy) 1,1'-biphenyl dianhydride and" should read
-- bis(3,4-dicarboxyphenoxy)1,1'-biphenyl dianhydride; --
Line 67, "2,2-bis(3,4-dicarboxyphenoxy) 1,1'-binaphthyl dianhydride," should read
-- 2,2'-bis(3,4-dicarboxyphenoxy)1,1'-binaphthyl dianhydride; --

UNITED STATES PATENT AND TRADEMARK OFFICE
CERTIFICATE OF CORRECTION

PATENT NO. : 6,642,348 B2
DATED : November 4, 2003
INVENTOR(S) : Eby et al.

It is certified that error appears in the above-identified patent and that said Letters Patent is hereby corrected as shown below:

Column 26,
Line 15, "2,2-Bis(4-(3,4-dicarboxyphenoxy) phenoxy biphenyl," should read -- 2,2'-bis(4-(3,4-dicarboxyphenoxy)phenoxy) biphenyl; --
Line 16, "2,2'-Bis(4-(3,4-dicarboxyphenoxy)phenoxy" should read -- 2,2'-bis(4-(3,4-dicarboxyphenoxy)phenoxy) --

Signed and Sealed this

Eighth Day of June, 2004

JON W. DUDAS
*Acting Director of the United States Patent and Trademark Office*